(12) United States Patent
Choy

(10) Patent No.: US 9,776,119 B2
(45) Date of Patent: Oct. 3, 2017

(54) SYSTEM FOR PROVIDING FLOW OF FILTERED AIR

(71) Applicant: Chan Seng Choy, Singapore (SG)

(72) Inventor: Chan Seng Choy, Singapore (SG)

(73) Assignee: Chan Seng Choy, Singapore (SG)

( * ) Notice: Subject to any disclaimer, the term of this patent is extended or adjusted under 35 U.S.C. 154(b) by 98 days.

(21) Appl. No.: 14/972,116

(22) Filed: Dec. 17, 2015

(65) Prior Publication Data
US 2016/0184754 A1 Jun. 30, 2016

(30) Foreign Application Priority Data
Dec. 30, 2014 (IN) .......................... 6709/CHE/2014

(51) Int. Cl.
| | | |
|---|---|---|
| B01D 39/00 | (2006.01) | |
| B01D 50/00 | (2006.01) | |
| F16B 1/00 | (2006.01) | |
| F16M 13/02 | (2006.01) | |
| B01D 46/00 | (2006.01) | |
| B01D 46/10 | (2006.01) | |

(52) U.S. Cl.
CPC ..... *B01D 46/0005* (2013.01); *B01D 46/0023* (2013.01); *B01D 46/10* (2013.01); *B01D 2273/30* (2013.01)

(58) Field of Classification Search
CPC .... B01D 39/00; B01D 50/00; B01D 46/0005; F16B 11/006; F16B 1/00; F16B 2001/0035; F16M 13/022; F16M 13/02

USPC ..... 55/495, 315, 471, 500, DIG. 5, DIG. 31, 55/385.1, 490, 497, 509, 511; 96/134
See application file for complete search history.

(56) References Cited

U.S. PATENT DOCUMENTS

| | | |
|---|---|---|
| 1,794,447 A | 3/1931 | Bothezat |
| 1,916,907 A | 7/1933 | Sargent |
| 2,639,004 A | 5/1953 | McIntyre |
| D201,932 S | 8/1965 | Talge et al. |
| 3,675,402 A * | 7/1972 | Weed .................. F24F 3/1603 160/374 |
| 3,698,308 A | 10/1972 | Navara |
| D227,669 S | 7/1973 | Mann |
| 3,826,182 A | 7/1974 | Navara |
| 3,861,894 A | 1/1975 | Marsh |
| D234,597 S | 3/1975 | Diachuk |
| 3,928,008 A | 12/1975 | Petersen |
| D248,869 S | 8/1978 | Risher |
| 4,252,547 A | 2/1981 | Johnson |

(Continued)

FOREIGN PATENT DOCUMENTS

| | | |
|---|---|---|
| CA | 76431 S | 5/1995 |
| CN | 101480552 | 7/2009 |

(Continued)

*Primary Examiner* — Jacob T Minskey
*Assistant Examiner* — Minh-Chau Pham

(57) ABSTRACT

A system for providing flow of filtered air is provided. The system includes a casing (202) and an air filtration system (204). The casing (202) accommodates the air filtration system (204). The casing (202) may be configured to be fixed to a window frame (102). The window frame (102) may be configured to accommodate at least one sliding window (104). Further, the casing (202) fixed to the window frame (102) may be intermediate to a first side (102a) of the window (102) and a sash (106) of the sliding window (104).

6 Claims, 10 Drawing Sheets

(56) References Cited

U.S. PATENT DOCUMENTS

| | | | |
|---|---|---|---|
| 4,272,261 A | | 6/1981 | Lynch, Jr. |
| D272,558 S | | 2/1984 | Greubel |
| D272,645 S | | 2/1984 | Muller |
| D272,646 S | | 2/1984 | Tsuji et al. |
| D274,645 S | | 7/1984 | Grube |
| 4,488,888 A | | 12/1984 | Doyle |
| D315,201 S | | 3/1991 | Muller |
| 5,059,218 A | * | 10/1991 | Pick ........................ B03C 3/155 160/371 |
| 5,492,551 A | * | 2/1996 | Wolfe ..................... A41D 13/11 55/496 |
| 8,172,919 B1 | * | 5/2012 | Ruiz ................... B01D 46/0002 55/315 |
| 2004/0065029 A1 | | 4/2004 | Morris |
| 2007/0157585 A1 | * | 7/2007 | Lee ........................... E06B 7/10 55/385.1 |
| 2015/0375152 A1 | * | 12/2015 | Simmons .................. E06B 9/01 55/491 |

FOREIGN PATENT DOCUMENTS

| | | |
|---|---|---|
| CN | 202709326 | 1/2013 |
| CN | 203303801 | 11/2013 |
| JP | H0264337 | 3/1990 |
| KR | 20030087872 | 7/2005 |
| KR | 20130023949 | 9/2013 |

* cited by examiner (A-A)

SYSTEM FOR PROVIDING FLOW OF FILTERED AIR

BACKGROUND

Field

The subject matter in general relates to filtering of air. More particularly, but not exclusively, the subject matter relates to filtering of air that enters indoors from outdoor.

Description of Related Field

Effects of air pollution on human health are a major cause of concern. Hence, new buildings are equipped with air processing units that process air entering indoor. However, some of the old building may not be equipped with such air processing units.

Windows of such old buildings may be kept shut to prevent outside air from entering indoor. However, such a measure will lead to depletion of oxygen levels in the air present indoor. Hence, eventually windows will have to be opened to allow outside air to enter indoor. However, opening of windows lead to polluted air entering indoor, which may affect human health.

Several solutions have been proposed for processing air. Prior art references U.S.20040065029, U.S. Pat. Nos. 3,826, 182, 2,639,004 and CN203303801 disclose providing a filter barrier between outdoor and indoor air. In the techniques disclosed in the instant references, natural wind or convectional air flow results in air entering indoors. Therefore, only coarse filters can be used, which may be capable of filtering only large particles or insects from the air entering indoors, and may fail to filter fine particles like PM2.5 or toxic gasses. Similarly, the technique disclosed in U.S. Pat. No. 3,698,308 may not be capable of filtering fine particles like PM2.5 or toxic gasses.

A few more air processing systems are disclosed in U.S. Design Pat. Nos. D315201, D201932, D227669, D234597, D248869, D258759, D272558, D272645, D272646 and D274645. Some more air processing systems are disclosed in U.S. Pat. Nos. 4,488,888, 3,861,894, 3,928,008, 4,252, 547, 4,272,261, CN20132306216(U) and KR20130023949. Some of these systems are configured to re-circulate and filter air present indoor, and such systems may not filter the air entering indoor from outdoor.

Further, U.S. Pat. Nos. 1,916,907 and 1,794,447 disclose systems that may enable introduction of filtered air from outdoors to the indoors. However, deployment of such systems can only be done with prior preparation for a new construction or significant modifications to existing structures, requiring much time and effort. Similarly, techniques disclosed in JPH0264337, CN202709326, CN101480552, CA76431(S) and KR20030087872 may not be suitable for rapid deployment and installation in window frames that may be adapted for receiving sliding window.

In light of the foregoing discussion, there may be a need for a technique that may enable filtering of air entering indoors from outdoor. The technique may enable rapid and easy deployment of a filtering system that filters air entering indoors from outdoor. Further, the technique may enable engaging the filtering system to a window frame that may be adapted for receiving sliding window.

SUMMARY

In an embodiment, a system for providing flow of filtered air is disclosed. The system may include a casing configured to be fixed to a window frame that is configured to accommodate at least one sliding window. The casing, when fixed to the window frame, is intermediate to a first side of the window frame and a sash of the sliding window. The instant casing accommodates at least an air filtration system.

BRIEF DESCRIPTION OF DRAWINGS

Embodiments are illustrated by way of example and not limitation in the Figures of the accompanying drawings, in which like references indicate similar elements and in which.

DETAILED DESCRIPTION

Figure 1A:
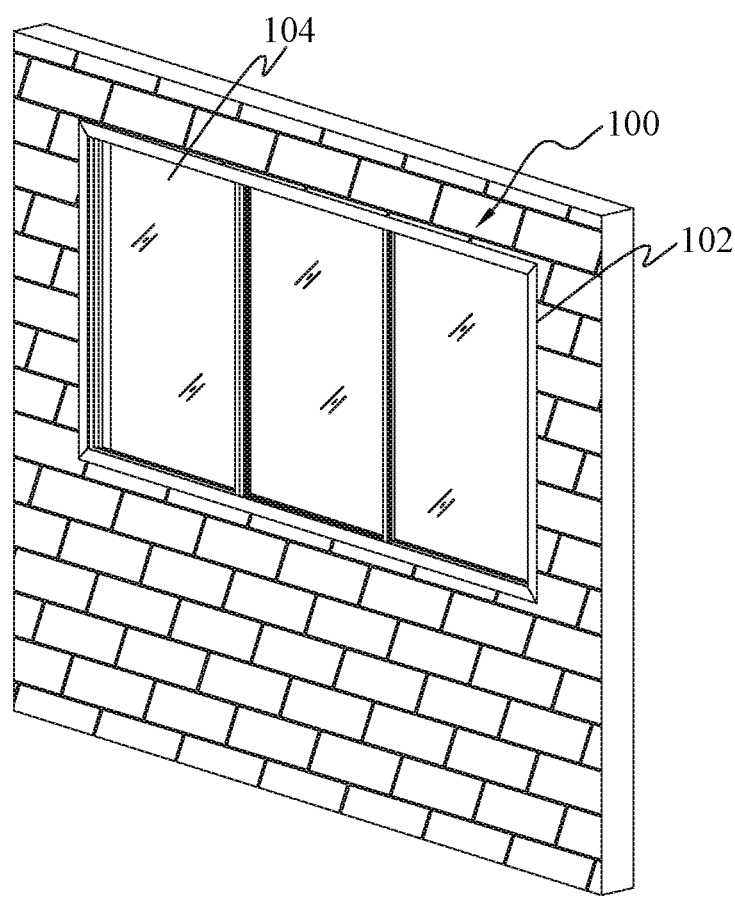
FIG. 1A is a perspective view of a window assembly 100 mounted to a wall.
Figure 1B:
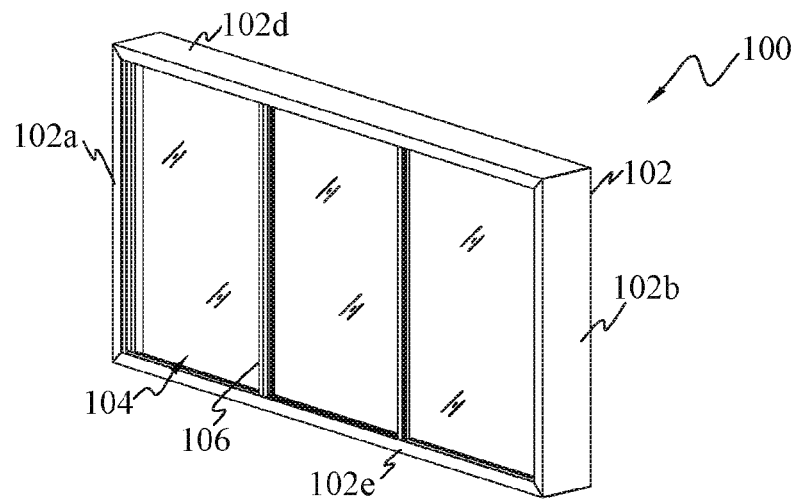
FIG. 1B is a perspective view of the window assembly 100 of FIG. 1A, without depicting the wall.
Figure 1C:
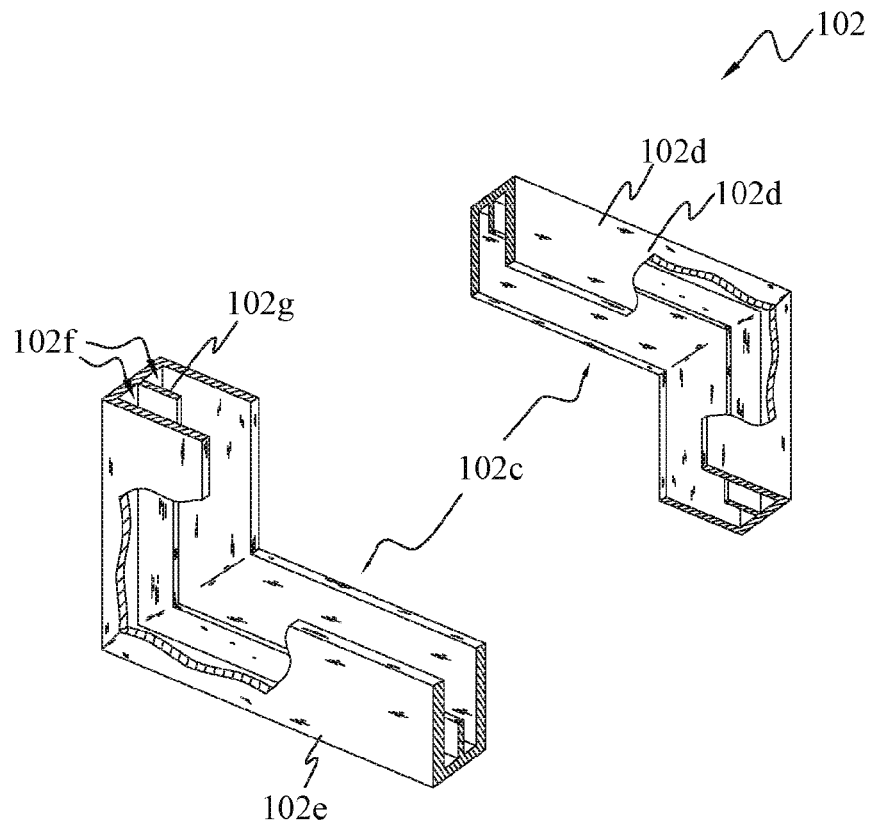
FIG. 1C is a perspective view of portions of a window frame 102 of the window assembly of FIG. 1A.
Figure 1D:
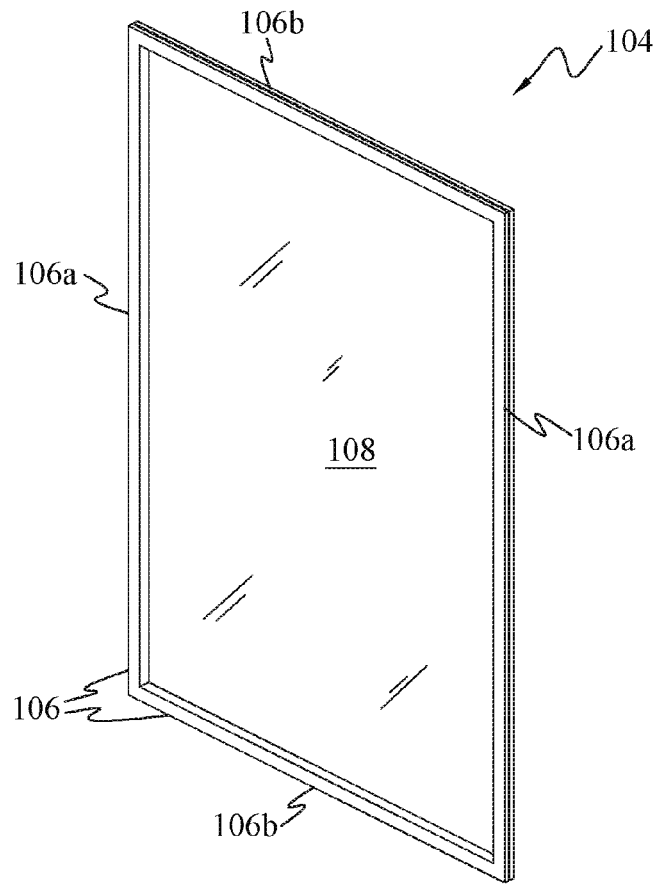
FIG. 1D is a perspective view of a sliding window 104 configured to be received by the window frame 102 of FIG. 1C.
Figure 1E:
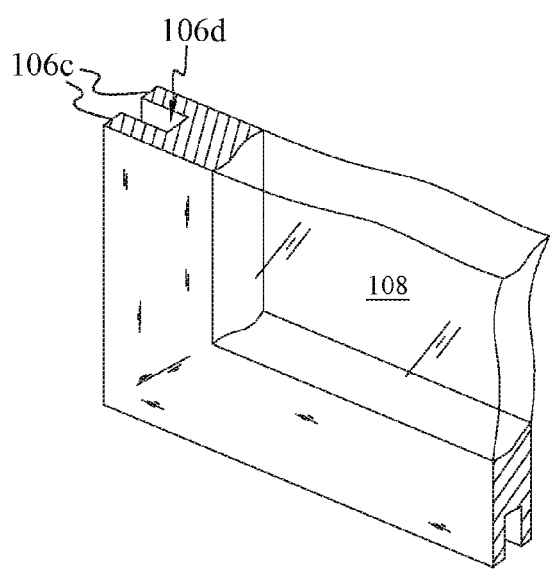
FIG. 1E is a perspective view of portions of a window sash 106 of the sliding window 104 of FIG. 1D.

In an embodiment a system for providing flow of filtered air from outdoor to indoor is provided. The system may be accommodated in a window frame configured to receive at least one sliding window sash. The system includes a casing that is configured to accommodate at least one air filtration system. The sliding window sash is slid to define an opening. The casing is mounted onto the window frame, and the window sash is slid back to engage with the casing, thereby sealing the gap between the casing and the window sash. The air filtration system may include an air blower and a first air filter. The air blower drives air from outdoor to indoor through the first air filter, which filters the air flowing indoor.

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Referring to FIGS. 1A-1E, a window assembly 100 may include a window frame 102 and a sliding window 104, which includes a sash 106 and a window pane 108. The window frame 102 may be secured to a wall of a building by methods known in the prior art. The window frame 102 may be rectangular in shape.

The window frame 102 includes a first side 102a, a second side 102b and sash tracks 102c (a head 102d and a sill 102e). At least three sides of the window frame 102 may have at least two grooves 102f and a protrusion 102g defined between the grooves 102f. The window frame 102 is configured to accommodate at least one sliding window 104, and allow it to slide along the sash tracks 102c.

The sash 106 of the sliding window 104 includes a stile 106a and a rail 106b. The stile 106a and the rail 106b of the sash 106 include at least two protrusions 106c and at least one groove 106d defined by the protrusions 106c. Each of the protrusions 106c of the sash 106 is configured to mate with one of the grooves 102f in the first side 102a of the window frame 102. Further, the protrusion 102g in the window frame 102 is configured to be received by the groove 106d present in the stile 106a and the rail 106b of the sash 106 of the sliding window 104.

Figure 2:
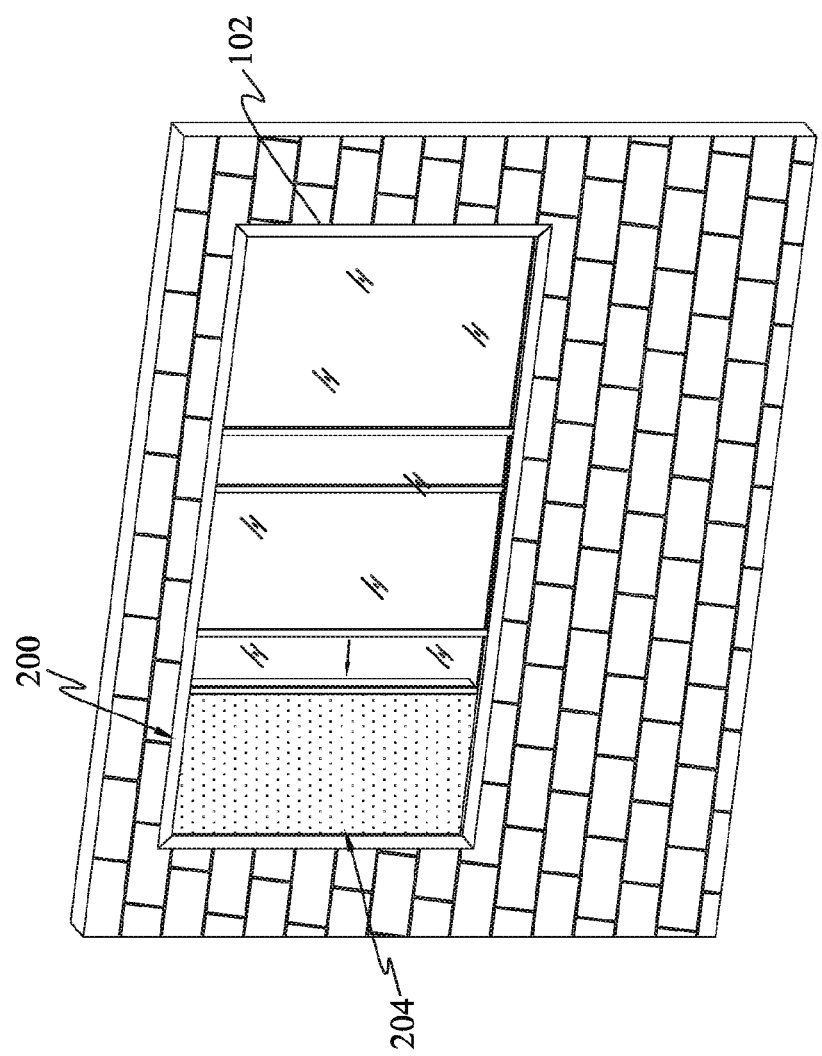
FIG. 2 is a perspective view of a system 200 for providing flow of filtered air from outdoor to indoor.
Figure 3A:
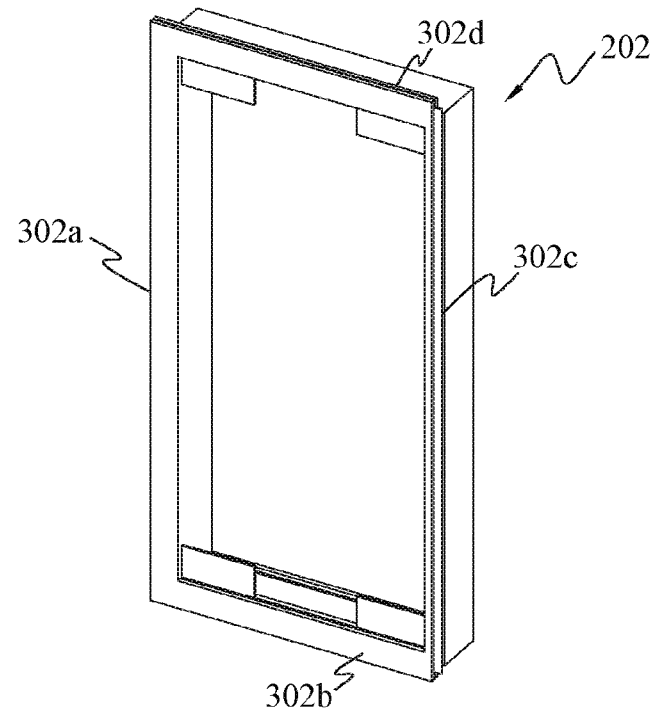
FIG. 3A is a perspective view of a casing 202 of the system 200 of FIG. 2.
Figure 3B:
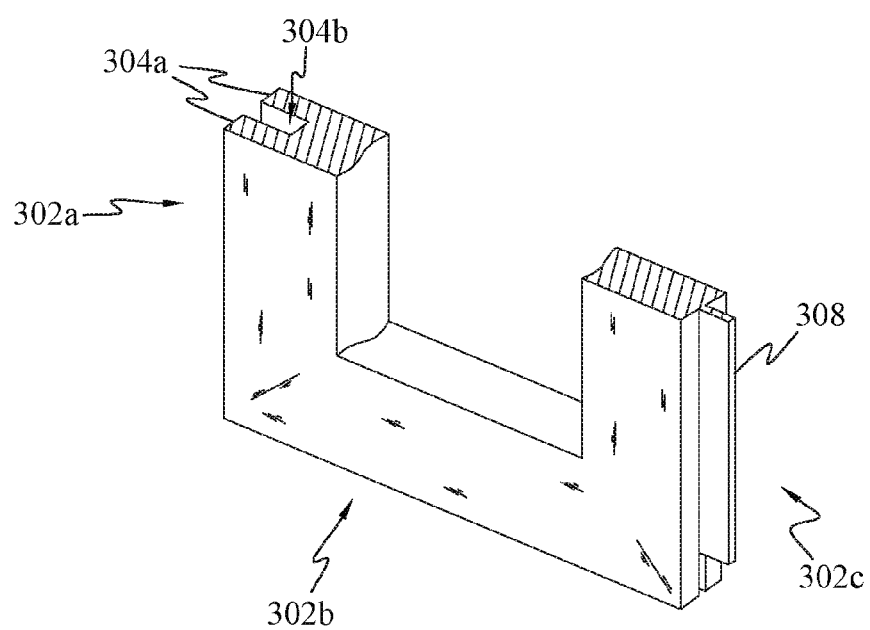
FIG. 3B is a perspective view of a portion of the casing 202.
Figure 3C:
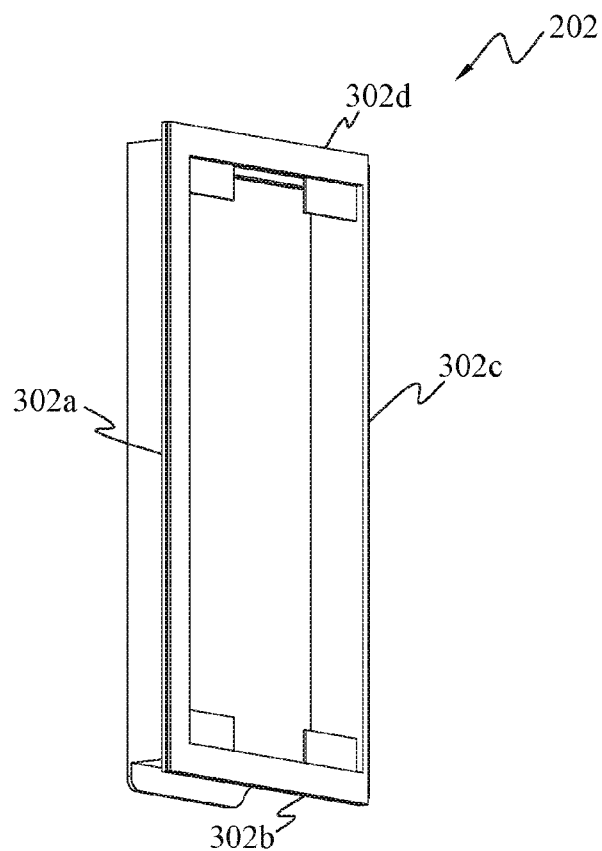
FIG. 3C is another perspective view of the casing 202.
Figure 3D:
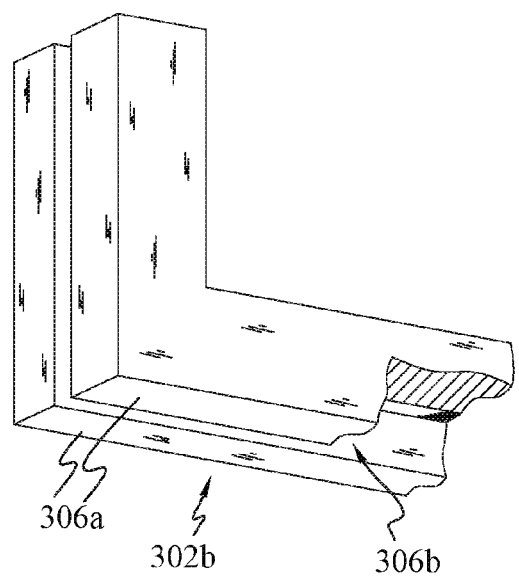
FIG. 3D is a perspective view of a portion of the casing 202 in which a second section 302b of the casing 202 is visible.
Figure 3E:
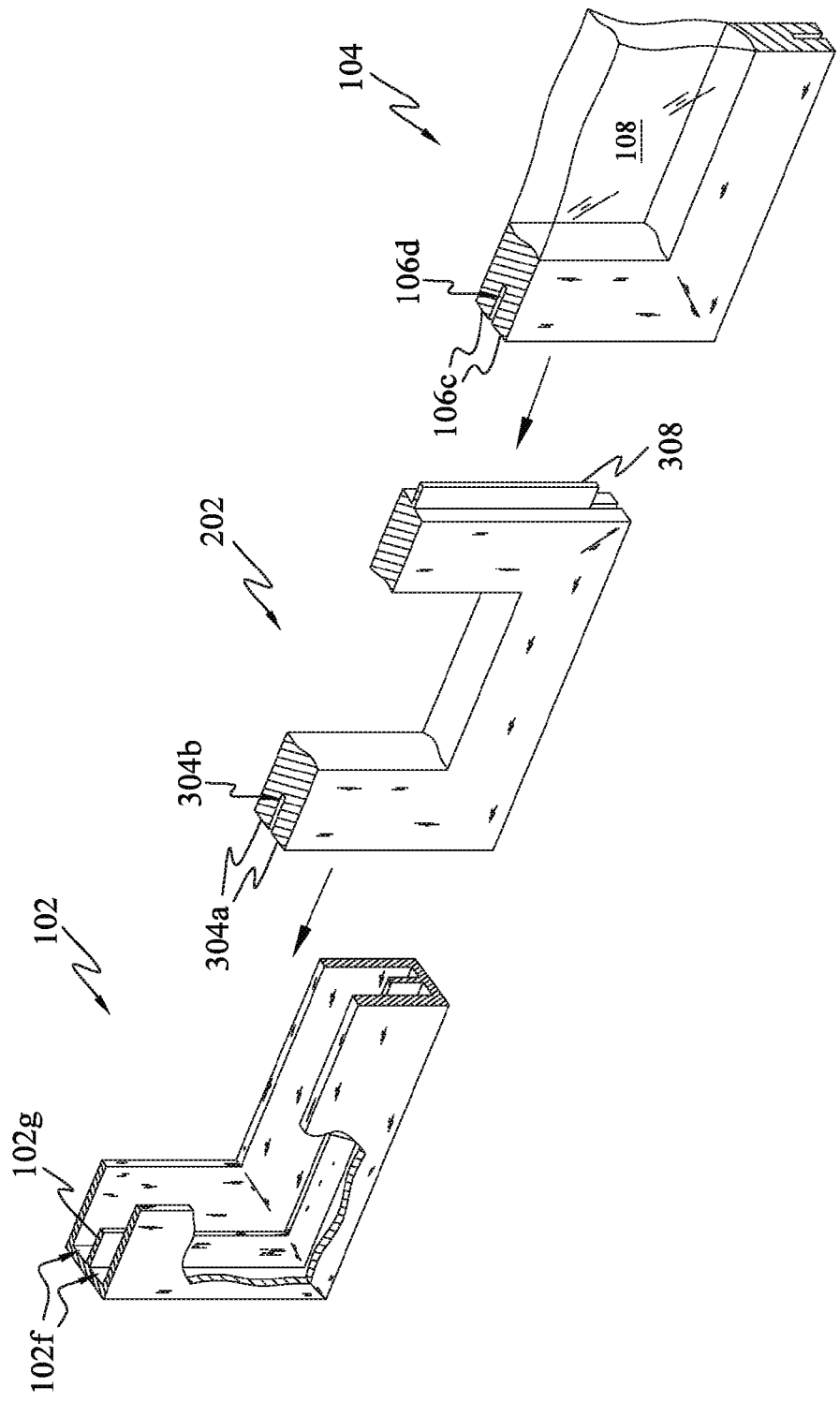
FIG. 3E is a perspective view illustrating assembly of the casing 202 with the window frame 102 and the sliding window 104.
Figure 3F:
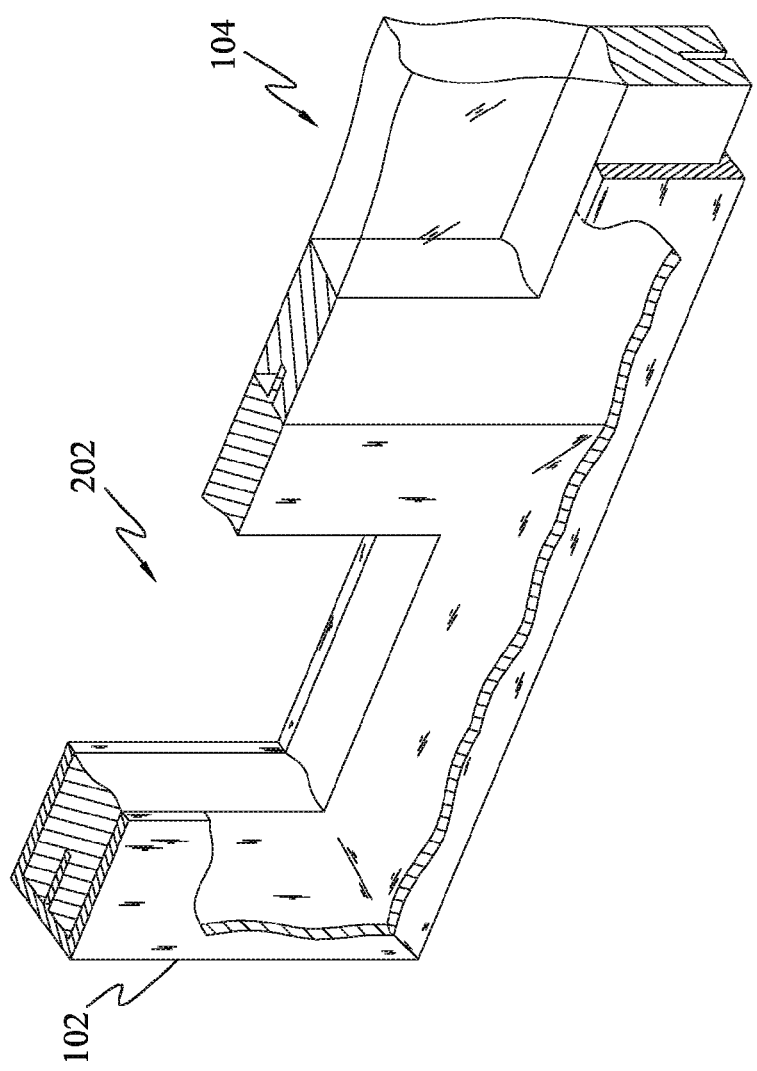
FIG. 3F is a perspective view illustrating engagement of the casing 202 with the window frame 102 and the sliding window 104.
Figure 4B:
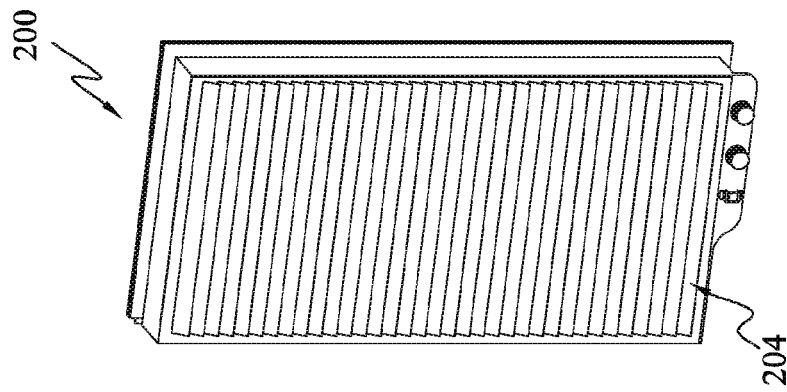
FIG. 4B is a perspective view illustrating the air filtration system 204 accommodated by the casing 202.
Figure 4A:
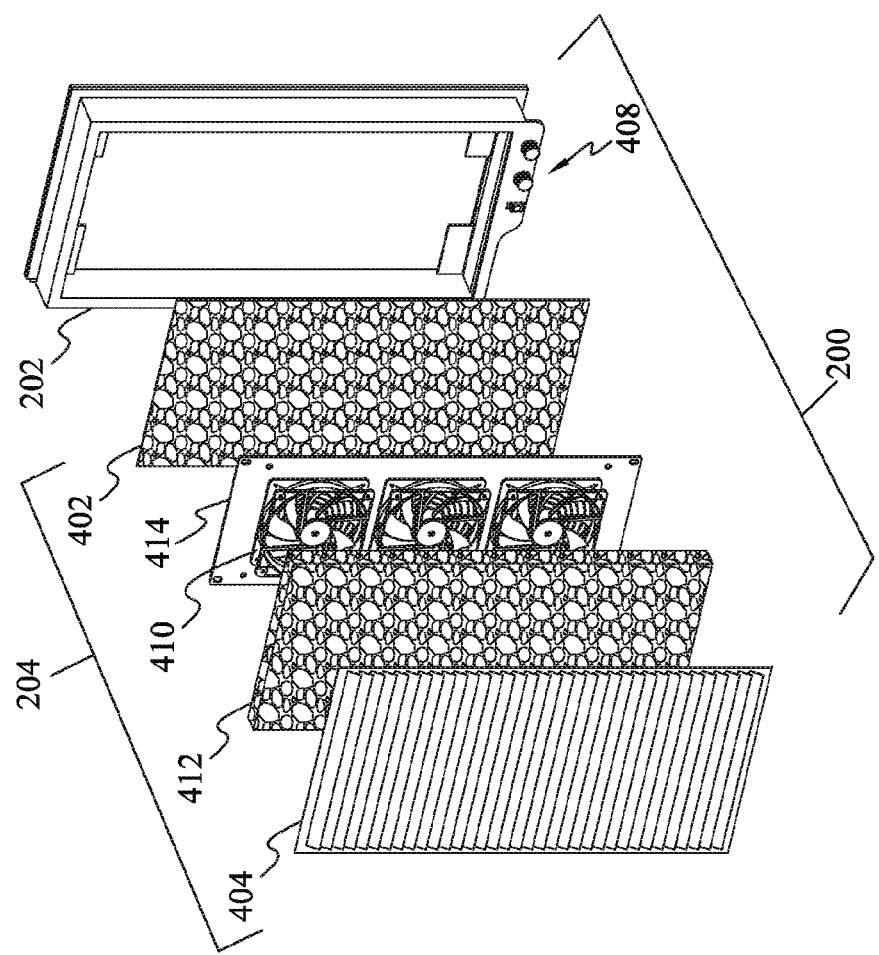
FIG. 4A is an exploded view of an air filtration system 204 and the casing 202 that accommodates the air filtration system 204.
Figure 5A:
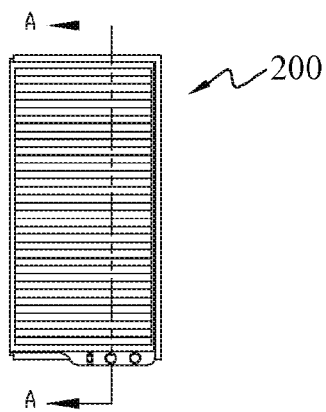
FIG. 5A is a front view (from indoor) of the system 200.
Figure 5B:
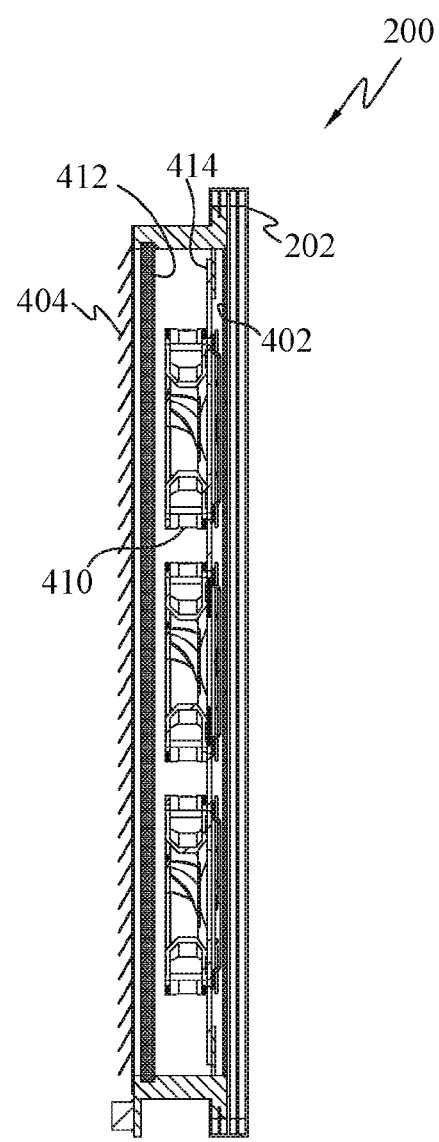
FIG. 5B is a cross sectional view (A-A) of the system 200.

Referring to FIGS. 2 and 3A, a system 200 is configured to provide flow of filtered air from outdoor to indoor. The system 200 is configured to be mounted to the window frame 102. The system 200 includes a casing 202 that accommodates an air filtration system 204.

Referring to FIGS. 3A-3F, the casing 202 may include a first section 302a, a second section 302b, a third section 302c and a fourth section 302d. The first section 302a of the casing 202 may be facing the first side 102a of the window frame 102. The first section 302a of the casing 202 may include at least two protruding features 304a, and at least a groove 304b defined by the protruding features 304a.

The second section 302b of the casing 202 may be facing the sash track 102c (sill 102e) of the window frame 102. The second section 302b of the casing 202 may include at least two protruding features 306a, and at least a groove 306b defined by the protruding features 306a.

Further, the third section 302c of the casing 202 may be facing the sash 106 (stile 106a) of the window frame 102. The third section 302c of the casing 202 may include at least one protruding feature 308.

The casing 202 with the accommodated air filtration system 204 is engaged with the window frame 102 in a space created between the first side 102a of the window frame 102 and the sash 106 of the sliding window 104, when the sliding window 104 is moved away from the first side 102a of the window frame 102.

The casing 202 fixed on the window frame 104 is configured to be intermediate to the first side 102a of the window frame 102 and the sash 106 (stile 106a) of the sliding window 104.

The two protruding features 304a of the first section 302a of the casing 202 are configured to be received by the two grooves 102f provided in the first side 102a of the window frame 102. Further, the groove 304b in the casing 202 may receive the protrusion 102g provided in the first side 102a of the window frame 102.

Likewise, the two protruding features 306a of the second section 302a of the casing 202 are configured to be received by the two grooves 106d provided in the sash track 106 of the window frame 102. Further, the groove 306b in the casing 202 may receive the protrusion 106c provided in the sash track 102c (sill 102e) of the window frame 102.

Upon mounting of the casing 202 to the window frame 102, the sash 106 is slid back to engage with the casing 202, thereby sealing the gap between the casing 202 and the window sash 106. The third section 302c of the casing 202 is configured to mate with the sash 106 (stile 106a) of the sliding window 104. The protruding feature 308 of the third section 302c may be received by the groove 106d provided in the sash 106 (stile 106a) of the sliding window 104.

It shall be noted that the design of the casing 202 may be altered accordingly depending on the structure of the window frame 102 and the sash 106 of the sliding window 104. Further, there may be plurality of protruding features and grooves provided in the casing 202. In order to enable the engagement of the casing 202 between the sash 106 of the sliding window 104 and the window frame 102, the first section 302a of the casing 202 may be received by the first side 102a of the window frame 102, the second section 302b may be received by the sash track 106, and the third section 302c may mate with the sash 106 of the sliding window 104.

Referring to FIGS. 4A-5B, the system 200 comprising the casing 202 accommodates the air filtration system 204. The air filtration system 204 includes a first air filter 412, a second air filter 402, a plurality of air blowers 410, a plurality of movable blades 404 and a control mechanism 408.

The air blowers 410 may be held by a housing 414 engaged to the casing 202 (a single air blower may be provided in an alternative embodiment). The air blowers 410 are configured to be disposed intermediate to the first air filter 412 and the second air filter 402. The air blowers 410 drive the air from outdoor into the air filtration system 204 via the second filter 402.

The second air filter 402 accommodated in the casing 202 is configured to filter pollutants present in the air that enters from outdoor into the air filtration system 204. In an embodiment, the second air filter 402 may be configured to restrict entry of large particles or insects in the air that enters the air filtration system 204.

The first air filter 412 accommodated in the casing 202 is intermediate to the plurality of movable blades 404 and the air blower 410. The first air filter 412 filters the air eventually entering indoor.

The first air filter 412 may be configured to filter fine particles like PM 2.5 or toxic gases present in the air flowing via the first air filter 412 indoor. These types of filters have much higher resistance to air flow and demand much higher air pressure difference that natural airflow cannot overcome in general practice.

Example of the first air filter 412 may include, but not limited to, High-efficiency Particulate Air (HEPA) filter, carbon impregnated mesh, carbon particles, metal mesh, electrostatic plate, screen, paper, foam, cotton, fibers, ceramics, plastics, mesh or a combination thereof.

In an embodiment, the plurality of movable blades 404 accommodated by the casing 202 may be facing an inner side of a room. The alignment of the plurality of movable blades 404 may be configured to be altered to define gap in-between adjacent blades to control flow of air entering indoor through the first air filter 412 of the air filtration system 204.

The control mechanism 408 may be accommodated by the casing 202. The control mechanism 408 can perform functions such as, but not limited to, switching on or off the air filtration system 204, adjusting the speed of one or more air blowers 410, controlling alignment of the plurality of movable blades 404, timer for switching the air filtration system 204 on or off, maintenance interval display, fault indicator, and remote control among others.

In an embodiment, although not illustrated in figures, a pressure balancing device may be included in the air filtration system 204 to balance air pressure indoor. The pressure balancing device may include a one-way valve that opens to relieve air thereby reducing pressure that may have built-up indoor. The air filtration system 204 may also include mechanism to recycle air present indoor.

One or more embodiments provide several advantages, some of which are provided below.

The current technique may enable engaging the filtering system to a window frame that may be adapted to receive sliding window.

The technique may enable rapid and easy deployment of a filtering system that filters air entering indoors from outdoor.

Although, embodiments have been described with reference to specific example embodiments, it will be evident that various modifications, arrangements of components and changes may be made to these embodiments without departing from the broader spirit and scope of the pointing instrument described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus the scope of the invention should be determined by the appended claims and their legal equivalents rather than by the examples given.

What is claimed is:

1. A system for providing flow of filtered air, the system comprising:
    a casing configured to be fixed to a window frame that is configured to accommodate at least one sliding window, wherein the casing, when fixed to the window frame, is intermediate to a first side of the window frame and a sash of the sliding window, wherein the casing accommodates at least an air filtration system and the casing comprises:
        a first section facing the first side of the window frame, wherein the first section comprises at least two protruding features, wherein the two protruding features are configured to be received by two grooves provided in the first side of the window frame;
        a second section facing a sash track of the window frame, wherein the second section comprises at least two protruding features, wherein the two protruding features of the second section are configured to be received by two grooves provided in the sash track of the window frame; and
        a third section facing the window sash, wherein the third section comprises at least one protruding feature, wherein the protruding feature is configured to be received by a groove provided in the sash of the sliding window.

2. The system of claim 1, wherein the casing comprises a first section, a second section and a third section, which the first section is received by the first side of the window frame, the second section is received by a sash track, and the third section mates with the sash of the sliding window.

3. The system of claim 1, wherein the casing accommodates at least air blower and a first air filter, wherein the air blower drives air from outdoor to indoor through the first air filter.

4. The system of claim 3, wherein the casing further accommodates a plurality of movable blades whose alignment is configured to be altered to define a gap in-between adjacent blades to control flow of air entering indoor through the first air filter.

5. The system of claim 3, wherein the casing further accommodates a second air filter, wherein the air blower is intermediate the second air filter and the first air filter.

6. The system of claim 1, further comprising a pressure balancing device to balance air pressure indoor.

* * * * *